(12) United States Patent
Boss et al.

(10) Patent No.: US 8,914,854 B2
(45) Date of Patent: Dec. 16, 2014

(54) USER CREDENTIAL VERIFICATION INDICATION IN A VIRTUAL UNIVERSE

(75) Inventors: Gregory J. Boss, American Fork, UT (US); Peter G. Finn, Brampton (CA); Rick A. Hamilton, II, Charlottesville, VA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 12/208,515

(22) Filed: Sep. 11, 2008

(65) Prior Publication Data

US 2010/0064359 A1    Mar. 11, 2010

(51) Int. Cl.
*G06F 7/04* (2006.01)
*G06F 15/16* (2006.01)
*G06F 17/30* (2006.01)
*H04L 29/06* (2006.01)
*G06F 21/34* (2013.01)
*G06F 21/32* (2013.01)

(52) U.S. Cl.
CPC .............. *G06F 21/34* (2013.01); *G06F 21/32* (2013.01)
USPC .............. 726/5; 726/4; 726/28; 726/29

(58) Field of Classification Search
CPC .......... G06F 21/30; G06F 21/31; G06F 21/36
USPC ............................................. 726/5
See application file for complete search history.

(56) References Cited

U.S. PATENT DOCUMENTS

| | | | |
|---|---|---|---|
| 6,802,007 B1 * | 10/2004 | Canelones et al. ............. | 713/193 |
| 8,397,168 B2 * | 3/2013 | Leacock et al. ............... | 715/757 |
| 2001/0040575 A1 * | 11/2001 | Haga et al. ..................... | 345/473 |
| 2002/0086730 A1 * | 7/2002 | Nakai ............................ | 463/41 |
| 2003/0014423 A1 * | 1/2003 | Chuah et al. ................... | 707/102 |
| 2004/0224761 A1 * | 11/2004 | Nishimura ...................... | 463/33 |
| 2005/0266925 A1 * | 12/2005 | Hornell et al. .................. | 463/42 |
| 2007/0087822 A1 * | 4/2007 | Van Luchene .................. | 463/25 |
| 2007/0149290 A1 * | 6/2007 | Nickell et al. .................. | 463/42 |
| 2007/0225071 A1 * | 9/2007 | Van Luchene et al. ......... | 463/29 |
| 2008/0085767 A1 * | 4/2008 | Takatsuka ....................... | 463/32 |
| 2009/0113314 A1 * | 4/2009 | Dawson et al. ................. | 715/757 |
| 2009/0199095 A1 * | 8/2009 | Nicol et al. .................... | 715/704 |
| 2009/0216691 A1 * | 8/2009 | Borzestowski et al. ......... | 706/11 |
| 2009/0251457 A1 * | 10/2009 | Walker et al. .................. | 345/418 |
| 2009/0254968 A1 * | 10/2009 | Bussani et al. ................. | 726/1 |
| 2010/0023885 A1 * | 1/2010 | Reville et al. .................. | 715/764 |
| 2010/0037147 A1 * | 2/2010 | Champion et al. ............. | 715/751 |
| 2010/0081508 A1 * | 4/2010 | Bhogal et al. .................. | 463/40 |

* cited by examiner

*Primary Examiner* — Eleni Shiferaw
*Assistant Examiner* — Jing Sims
(74) *Attorney, Agent, or Firm* — Lisa Ulrich; Hoffman Warnick LLC

(57) ABSTRACT

A method, system and program product are provided that include verifying a credential of the user of a first avatar in the virtual universe; and establishing a zone that causes an indication of the credential of the user of the first avatar to appear in response to an action being taken relative to the zone.

18 Claims, 3 Drawing Sheets

USER CREDENTIAL VERIFICATION INDICATION IN A VIRTUAL UNIVERSE

FIELD OF THE INVENTION

The present invention relates to a virtual universe or virtual world and more specifically relates to user credential verification indication inside a virtual universe.

BACKGROUND OF THE INVENTION

A virtual universe is an interactive simulated environment accessed by multiple users through an online interface. Users inhabit and interact in the virtual universe via avatars, which are two or three-dimensional graphical representations. There are many different types of virtual universes, however there are several features many virtual universes generally have in common:
- Shared Space: the virtual universe allows many users to participate at once.
- Graphical User Interface: the virtual universe depicts space visually, ranging in style from 2D "cartoon" imagery to more immersive 3D environments.
- Immediacy: interaction takes place in real time.
- Interactivity: the virtual universe allows users to alter, develop, build, or submit customized content.
- Persistence: the virtual universe's existence continues regardless of whether individual users are logged in.
- Socialization/Community: the virtual universe allows and encourages the formation of social groups such as teams, guilds, clubs, cliques, housemates, neighborhoods, etc.

Virtual universes may also be referred to as massively multi-user online (MMO) environments.

An avatar can have a wide range of business and social experiences. Such business and social experiences are becoming more common and increasingly important in on-line virtual universes, such as that provided in the on-line world Second Life (Second Life® is a trademark of Linden Research in the United States, other countries, or both). The Second Life® client program provides its users (referred to as residents) with tools to view, navigate, and modify the Second Life world and participate in its virtual economy. Other examples of virtual universe environments include Entropia Universe (Entropia Universe is a registered trademark of Mindark) and Kaneva (Kaneva is a registered trademark of Kaneva Inc).

Second Life and other on-line virtual universes present a tremendous new outlet for both structured and unstructured virtual collaboration, gaming and exploration, as well as real-life simulations in virtual spaces. These activities, along with yet to be disclosed new dimensions, in turn provide a wide open arena for creative and new business interactions, methods and mechanisms.

One aspect in virtual universe is the determination of user credential verification by other users. For example, a user may want to undertake a business or social interaction with a reasonable level of confidence as to the other user's actual credentials in the real world.

SUMMARY OF THE INVENTION

User credential verification indication in a virtual universe is presented. One method includes verifying a credential of the user of a first avatar in the virtual universe; and establishing a zone that causes an indication of the credential of the user of the first avatar to appear in response to an action being taken relative to the zone.

A first aspect of the invention provides a method for user credential verification indication in a virtual universe, the method comprising: verifying a credential of a user of a first avatar in the virtual universe; and establishing a zone that causes an indication of the credential of the user of the first avatar to appear in response to an action being taken relative to the zone.

A second aspect of the invention provides a system for user credential verification indication in a virtual universe, the system comprising at least one computing device comprising: a verifier for verifying a credential of a user of a first avatar in the virtual universe; and a zone establisher for establishing a zone that causes an indication of the credential of the user of the first avatar to appear in response to an action being taken relative to the zone.

A third aspect of the invention provides a program product stored on a computer-readable storage medium, which when executed, performs a process comprising: verifying a credential of a user of a first avatar in the virtual universe; and establishing a zone that causes an indication of the credential of the user of the first avatar to appear in response to an action being taken relative to the zone.

A fourth aspect of the invention provides a method for user credential verification indication in a virtual universe, comprising: producing computer executable program code; storing the code on a computer readable medium; and providing the program code to be deployed and executed on a computer system, the program code comprising instructions which, when executed on the computer system, cause the computer system to: verifying a credential of a user of a first avatar in the virtual universe, and establishing a zone that causes an indication of the credential of the user of the first avatar to appear in response to an action being taken relative to the zone.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

The drawings are intended to depict only typical aspects of the invention, and therefore should not be considered as limiting the scope of the invention. In the drawings, like numbering represents like elements between the drawings. It is noted that the drawings of the invention are not to scale.

DETAILED DESCRIPTION OF THE INVENTION

Figure 1:
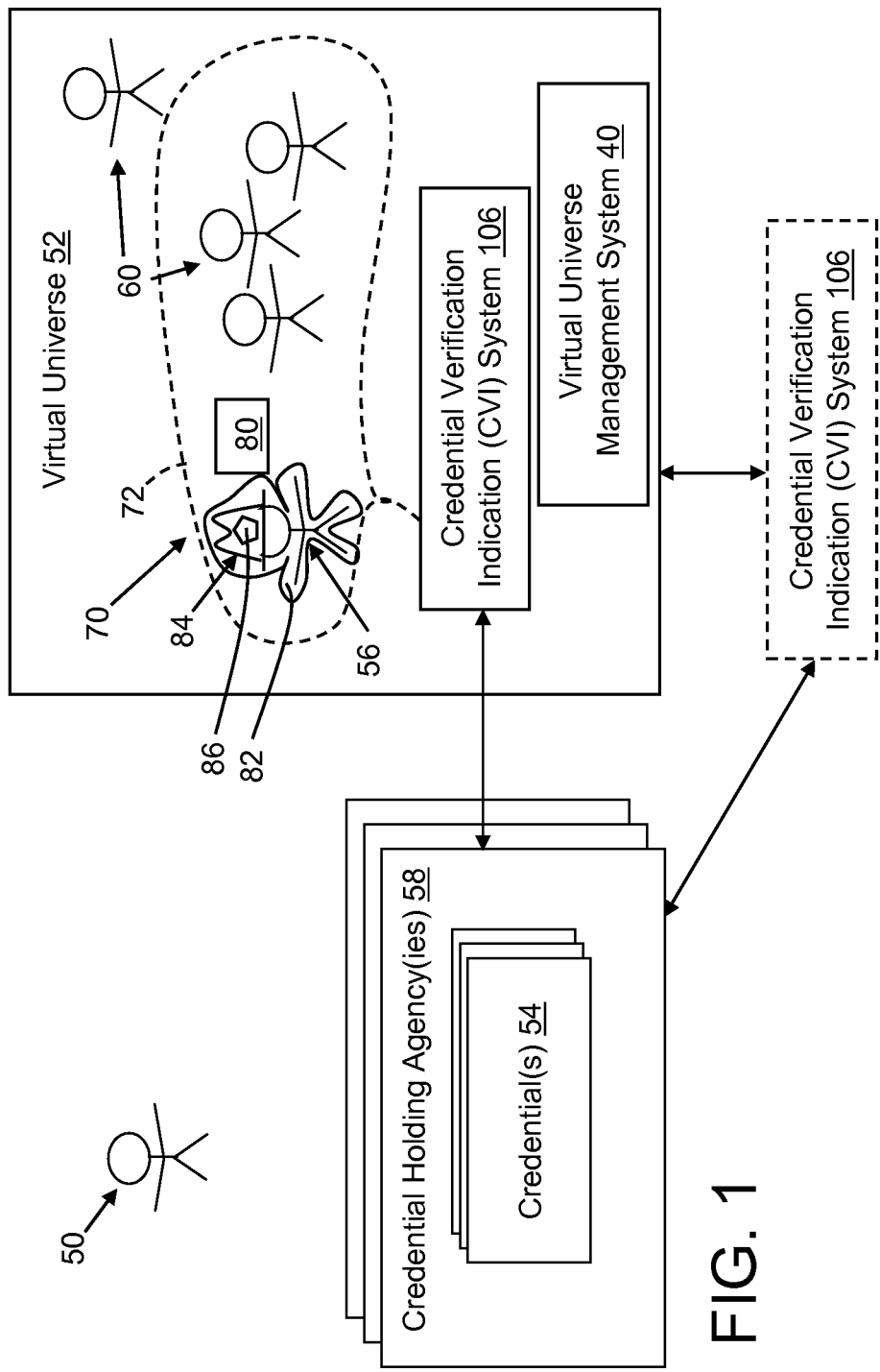
FIG. 1 depicts an illustrative system for user credential verification indication in a virtual universe in accordance with an embodiment of the invention.

As depicted in FIG. 1, embodiments of the present invention provides a credential verification indication (CVI) system 106 in a virtual universe 52. For this invention, focus is on real credential(s) 54 of a user 50 having an avatar 56 controlled by user 50. In this invention, "credential" may include any evidence concerning any actual characteristic of a user and, thus, may have a broader meaning than is typical. Credential(s) 54 may comprise practically any information about the avatar's user, for example, an occupational position or certification, credit rating, possessions, education level, employment status, income, place of residence, social circle volunteer actions, social security number, age, actual name, address, driver's license, etc. For example, the credential may be a real-world name on a credit card associated with a user or a real-world location of the user as associated with the credit card information. Credential(s) 54 may be generated or monitored by one or more credential holding agency(ies) 58, which may include, for example, an agency, credentialing association (e.g., labor union), etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable storage medium may be, for example but not limited to, an electronic, magnetic, optical, electromagnetic, infrared, or semiconductor system, apparatus, device, or propagation medium. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
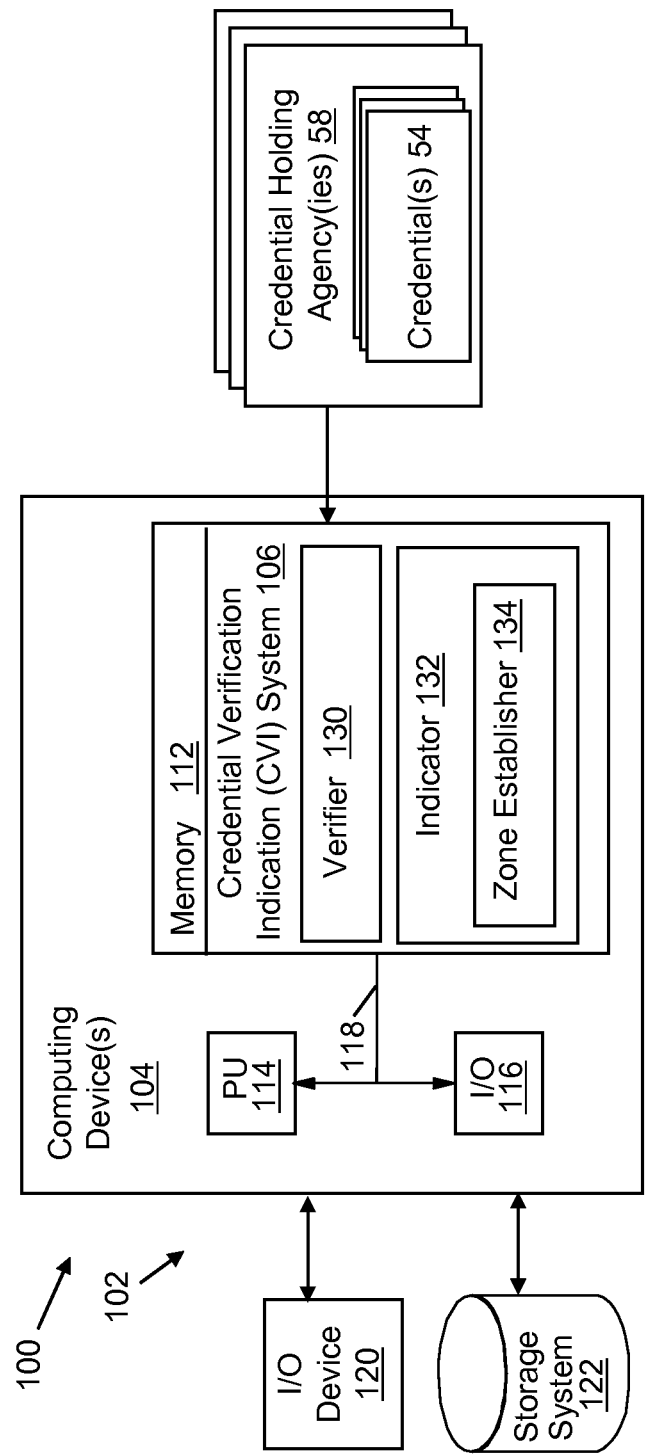
FIG. 2 depicts an illustrative computer system for implementing embodiment(s) of the present invention.

FIG. 2 shows an illustrative environment 100 including a computer infrastructure 102 that can perform the various process steps described herein for credential verification indication. In particular, computer infrastructure 102 is shown including at least one computing device 104 that comprises credential verification indication (CVI) system 106, which enables computing device 104 to indicate verified credential(s) of a user in the virtual universe 52 by performing the processes of the invention. CVI system 106 may be provided within the virtual universe 52 or (as shown in phantom) as a separate standalone system apart from the virtual universe 52. In this latter embodiment, CVI system 106 may be provided as a service compatible with a variety of different virtual universes 52.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as CVI system 106, that is stored in memory 112 and/or storage system 122. While executing computer program code, processor 114 can read and/or write data, such as credential(s) 54 (FIG. 1), to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and CVI system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, CVI system 106 enables computing infrastructure 102 to indicate verified credentials of a user's avatar. To this extent, CVI system 106 is shown including a verifier 130 and an indicator 132 including a zone establisher 134. Operation of each of these systems is discussed further below. However, it is understood that some of the various systems shown in FIG. 2 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 3:
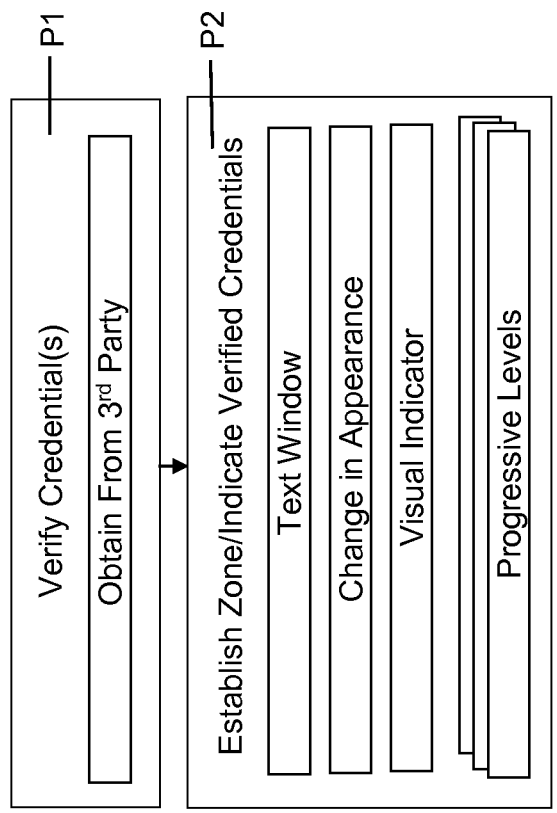
FIG. 3 depicts an illustrative process in accordance with an embodiment of the present invention.

Referring to FIG. 3 in conjunction with FIGS. 1-2, embodiments of a methodology will now be described. In process P1, verifier 130 verifies a credential of the user of a (first or target) avatar 56 in the virtual universe 52. Process P1 may be performed in a number of ways. In one embodiment, verifier 130 may access a third party outside of the virtual universe 52 (i.e., credential holding agency(ies) 58) to obtain credential(s) 54 verification based on a user 50 having previously registered with such credential holding agency(ies) 58 and providing adequate access permission to CVI system 106.

In another embodiment, verifier 130 may provide appropriate interfaces for a user 50 to establish verified credential(s) 54. In this case, verifier 130 may allow user 50 to register a real identity, register his/her credential(s) and register his/her avatar(s) 56. For example, user 50 may visit a network-connected location using a computing device. This location could either be in a physical world, virtual world or on a website or kiosk. User 50 would then register with CVI system 106, providing information about themselves including their real name and identification. The user's real name may then be verified using existing known verification methods. Alternatively, other identifiers, such as social security number, credit card information or other positive identifiers, can by used in place of the name. Examples of user verification include the provision of a credit card and date of expiration, a driver's license, or knowing the number and personal information such as the owner's real name, date of birth, or any form of biometric information including but not limited to voice biometrics, signature biometrics, DNA, retina and fingerprints. Other information that can be collected at this point may include a user's e-mail address, street address, home phone number, work number and any other information CVI system 106 may require. As an option, an additional online or offline verification process may occur. Once registered, depending on the amount of verification data provided and confirmed by verifier 130, an appropriate identity verification level is assigned to user 50 and/or his/her avatar 56. Generally, more information provided and confirmed by the verification process equates to higher identity verification levels.

Next, in this embodiment, user 50 could then upload all his/her relevant additional information to CVI system 106, e.g., to storage system 122. This information may include other personal, academic or any credentials they may possess. Verification of additional information provided can go through normal external services and channels for validation, e.g., credential holding agency(ies) 58. An example of this upload may be when a particular user 50 states they are a medical doctor. Their real name will then be validated with the college of physicians, or other verifying agency 58. Verifier 130 may also provide interfaces to establish for real-time validation of information, such as financial status with companies such as Equifax, who provide current credit rating information.

Finally, in this embodiment, user 50 can register the user name, password (optionally) and associated the virtual universe 52 account of one or more avatars 56 with CVI system 106 via verifier 130. This may occur for one or more accounts within one or more virtual universes 52, thus allowing verified credential indications in one or more virtual universes 52 from a single CVI system 106. This registration process will continue until all names and passwords are entered. Ideally, the existing virtual universe 52 space application program interfaces (API's) would be exploited or new ones created to verify that the logged in user 50 had authority to access (authentication credentials) to the accounts in the virtual universe 52 space. Essentially, a user 50 would register their virtual universe 52 accounts and avatars by entering the access credentials with verifier 130. In this way, verifier 130 could programmatically log into the user's virtual universe 52 accounts and verify the associate ownership and also potentially automatically populate any other fields necessary via the API. For example, a user who has already registered their real identity will log in to the verifier 130 and enter in their user id and password (and any other required information) to access the virtual universe 52 account and avatar(s). Once saved, verifier 130 can log into the user's virtual universe 52 account and record that it was successful, then optionally download any other relevant information that is available to that user id, e.g., the date the account was created, status of account, level, time used, etcetera. Some portions of this data can be used to verify or compare existing data in CVI system 106.

It is understood that the above-described methodology for verifying a user's credentials are not the only possibilities. In addition, the above-described embodiments may not be mutually exclusive.

Returning to the process flow of FIG. 3, in process P2, indicator 132 via zone establisher 134 establishes a zone 70 (FIG. 1) that causes an indication of the credential 54 of user 50 of avatar 56 to appear (in the virtual universe 52) in response to an action being taken relative to the zone. As will be described, the zone, the indication and the action can take a variety of forms. For example, in one embodiment, zone 70 includes an area 72 in the virtual universe 52 and the action includes avatar 56 being placed in the area or attempting to enter the area. In one application of this arrangement, other avatars 60 may enter area 72 and credentials 54 for the avatars 56, 60 appear for verification by the different users' credentials so that each user is assured the other users are credentialed as claimed. That is, user 50 and his/her potential partner avatar(s) 60 are positioned in area 72 and zone establisher 134 indicates verified credentials 54 of each user to the other users. In another application, an avatar 56 may have to hold a certain level of credential verification to enter an area 72. An area 72 may be graphically represented (e.g., an amber pentagonal plate may represent an area in some regions or worlds, but the specific graphical representation may be any conceivable). In any event, the verification occurs through three-dimensional (3-D) spatial location within the virtual universe 52. Although not limited to a business setting, one particular application that this invention finds advantage is relative to indications of age for retailers or individuals that cannot sell or interact inappropriately with underage individuals.

With regard to indication types, in one example, an indication may include the appearance of a text window 80 indicating credential(s) 54 or credential verification level of user 50. For example, the text window may include text like "John Doe, MD", "Jane Doe (New York)", etc. In another embodiment, the indication may take the form of a change in an appearance of avatar 56, e.g., a colored aura 82 may be presented about avatar 56 or other appearance change may occur, or some other visual indicator may be presented, e.g., a shape on avatar 56, a new piece of clothing such as a hat 84, etc. Practically any manner of graphically communicating may be employed as an indication. The indication may also include progressive levels corresponding to a level of credential verification of a user 50. For example, an avatar 56 may appear transparent where the user 50 does not have certain credentials 54, e.g., age above 18, driver's license, claimed professional certification, etc., and may appear different shades of a color depending on credentials. In another example, aura 82 may have different shades or other appearance differences that indicated different credentials. If necessary, a legend may be provided, e.g., in text window 80. More complicated progressive level indications could also be employed such as the reservation of badges, stamps, auras, size, or dynamically appearing indicators (for example those that only appear when requested).

In another embodiment, zone 70 may include an object in the virtual universe 52 and the action includes an avatar 56, 60 taking the action relative to the object. The object can be practically anything that an avatar may interact with such as a button that can be pushed, a stool that can be stood upon, etc. In one particular embodiment, the object may be a badge 86 associated with avatar 56 (e.g., on or about avatar 56) and the action includes a user of a second avatar mousing over, clicking on, and/or having the second avatar touch the badge 86, which causes an indication to appear such as aura 82 or a text window 80 including verified credential information. In another example, an action relative to an object created by a certified avatar could force a verification of credentials for the user that created the object. An example may include a qualified medical doctor who creates an informational kiosk on medical subjects. The object created would contain a digital seal, and clicking or otherwise accessing this digital seal could result in the credential validation being indicated. In this manner, an implied or forced verification may occur when an action relative to an object occurs. Similarly, event-based verification may occur, e.g., selling a good or service or the inclusion of an "adult term" in a conversation. Before the event could occur, credential verification would need to occur. This could include the ability to mouse over an avatar 56 and see a picture ID card such as a driver's license with all the verified credentials.

Indication of credential verification for avatar 56 may also be controlled by avatar 56. For example, one or more queries to indicator 132 using unique identifiers supplied by a virtual universe 52 management system 40 may be employed. These identifiers relate to specific elements already verified by CVI system 106 with respect to avatar 56. The requesting avatar 60 (or zone 72) may ask for a verification element and supplies a transaction ID. In this case, avatar 56 may accept the request and the virtual universe 52 management system 40 supplies a unique ID for that account/avatar 56. The requesting avatar 60 may then use that unique avatar ID and the transaction ID to query CVI system 106, i.e., indicator 132. Indicator 132 may then query avatar 56 for authorization to disclose the requested credential verification (using the transaction ID). In alternative embodiments, some pre-authorization of disclosure may be presumed. The target ID grants the request and indicator 132 supplies the requesting avatar 60 with the authorized credential verification. The user interface of the requesting avatar 60 then, for example, overlay the indication on avatar 56, or otherwise makes it available in a targeted fashion to the appropriate recipient. This methodology would typically involve native calls supported by the virtual universe 52 to and from avatars 56, 60 and virtual universe 52 management system 40. It may also be possible for data to be periodically cached by the virtual universe 52 management system 40, and replenished as necessary.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., credentials 54, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

Still yet, computer infrastructure 102 is intended to demonstrate that some or all of the components of implementation could be deployed, managed, serviced, etc. by a service provider who offers to implement, deploy, and/or perform the functions of the present invention for user credential verification indication in a virtual universe, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 102 that performs the process steps of the invention for user credential verification indication in a virtual universe, and in return the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for user credential verification indication in a virtual universe, the method comprising:
   verifying a credential of a user of a first avatar in the virtual universe, wherein the credential is selected from a group consisting of: an occupational position, an occupational certification, an education level, an employment status, an income, a social security number, an age, and a driver's license; and
   establishing a zone that causes an indication of the credential of the user of the first avatar to appear in response to an action being taken relative to the zone, wherein the zone is a graphical area in the virtual universe and the action includes the first avatar being placed in the graphical area, and wherein the indication of the credential appears only while the first avatar is in the graphical area, determined through a three-dimensional spatial location within the virtual universe, and wherein the indication of the credential is selected from a group consisting of: a text window, a change in an appearance of the avatar, and a visual indicator.

2. The method of claim 1, wherein the zone further includes an object in the virtual universe and the action further includes an avatar taking the action relative to the object.

3. The method of claim 2, wherein the object is a badge associated with the first avatar and the action includes a user of a second avatar performing at least one of: mousing over, clicking on, and having the second avatar touch the badge.

4. The method of claim 1, wherein the indication includes progressive levels corresponding to a level of credential verification.

5. The method of claim 1, wherein the verifying includes obtaining the credential verification from a third party outside of the virtual universe.

6. The method of claim 1, wherein a second credential is selected from a group consisting of: a real-world name on a credit card associated with a user and a real-world location of the user as associated with the credit card information.

7. A system for user credential verification indication in a virtual universe, the system comprising at least one computing device comprising:
   a verifier for verifying a credential of a user of a first avatar in the virtual universe, wherein the credential is selected from a group consisting of: an occupational position, an occupational certification, an education level, an employment status, an income, a social security number, an age, and a driver's license; and
   a zone establisher for establishing a zone that causes an indication of the credential of the user of the first avatar to appear in response to an action being taken relative to the zone, wherein the zone is a graphical area in the virtual universe and the action includes the first avatar being placed in the graphical area, and wherein the indication of the credential appears only while the first avatar is in the graphical area, determined through a three-dimensional spatial location within the virtual universe, and wherein the indication of the credential is selected from a group consisting of: a text window, a change in an appearance of the avatar, and a visual indicator.

8. The system of claim 7, wherein the zone further includes an object in the virtual universe and the action further includes an avatar taking the action relative to the object.

9. The system of claim 8, wherein the object is a badge associated with the first avatar and the action includes a user of a second avatar performing at least one of: mousing over, clicking on, and having the second avatar touch the badge.

10. The system of claim 7, wherein the indication includes progressive levels corresponding to a level of credential verification.

11. The system of claim 7, wherein a second credential is selected from a group consisting of: a real-world name on a credit card associated with a user and a real-world location of the user as associated with the credit card information.

12. A program product stored on a non-transitory computer-readable medium, which when executed, performs a process comprising:
   verifying a credential of a user of a first avatar in the virtual universe, wherein the credential is selected from a group consisting of: an occupational position, an occupational certification, an education level, an employment status, an income, a social security number, an age, and a driver's license; and establishing a zone that causes an indication of the credential of the user of the first avatar to appear in response to an action being taken relative to the zone, wherein the zone is a graphical area in the virtual universe and the action includes the first avatar being placed in the graphical area, and wherein the indication of the credential appears only while the first avatar is in the graphical area, determined through a three-dimensional spatial location within the virtual universe, and wherein the indication of the credential is selected from a group consisting of: a text window, a change in an appearance of the avatar, and a visual indicator.

13. The program product of claim 12, wherein the zone further includes an object in the virtual universe and the action further includes an avatar taking the action relative to the object.

14. The program product of claim 13, wherein the object is a badge associated with the first avatar and the action includes a user of a second avatar performing at least one of: mousing over, clicking on, and having the second avatar touch the badge.

15. The program product of claim 12, wherein the indication includes progressive levels corresponding to a level of credential verification.

16. The program product of claim 12, wherein the verifying includes obtaining the credential verification from a third party.

17. The program product of claim 12, wherein a second credential is selected from a group consisting of: a real-world name on a credit card associated with a user and a real-world location of the user as associated with the credit card information.

18. A method for user credential verification indication in a virtual universe, comprising:

producing computer executable program code;

storing the code on a computer readable medium; and providing the program code to be deployed and executed on a computer system, the program code comprising instructions which, when executed on the computer system, cause the computer system to:

verify a credential of a user of a first avatar in the virtual universe, wherein the credential is selected from a group consisting of: an occupational position, an occupational certification, an education level, an employment status, an income, a social security number, an age, and a driver's license, and establish a zone that causes an indication of the credential of the user of the first avatar to appear in response to an action being taken relative to the zone, wherein the zone is a graphical area in the virtual universe and the action includes the first avatar being placed in the graphical area, and wherein the indication of the credential appears only while the first avatar is in the graphical area, determined through a three-dimensional spatial location within the virtual universe, and wherein the indication of the credential is selected from a group consisting of: a text window, a change in an appearance of the avatar, and a visual indicator.

* * * * *